United States Patent [19]

Thor

[11] Patent Number: 4,492,292

[45] Date of Patent: Jan. 8, 1985

[54] COUPLING SYSTEM FOR POWER TAKE-OFF SHAFTS

[76] Inventor: Charles C. Thor, Box 654, Hutchinson, Minn. 55350

[21] Appl. No.: 405,908

[22] Filed: Aug. 6, 1982

[51] Int. Cl.³ .................. F16D 11/00; F16D 25/08
[52] U.S. Cl. .................. 192/67 R; 192/85 C; 192/114 R
[58] Field of Search ........... 192/67 R, 114 R, 85 C; 403/316, 318, 322, 324, 325

[56] References Cited

U.S. PATENT DOCUMENTS

| | | | |
|---|---|---|---|
| 2,070,140 | 2/1937 | Peterson et al. | 192/67 R X |
| 2,253,431 | 8/1941 | Johansen | 192/67 R |
| 2,505,881 | 5/1950 | Carnagua et al. | 192/114 R |
| 2,640,334 | 6/1953 | Spang | 192/67 R X |
| 2,894,775 | 7/1959 | Harless | 192/67 R |
| 2,904,804 | 9/1959 | Odessey | 192/67 R X |
| 2,917,019 | 12/1959 | Krueger | 192/67 R |
| 3,058,558 | 10/1962 | Hawk | 192/67 R |
| 3,302,960 | 2/1967 | Herrmann | 403/325 |
| 3,689,999 | 9/1972 | Swanke et al. | 192/67 R X |
| 3,709,343 | 1/1973 | Sigg | 192/67 R |
| 3,872,955 | 3/1975 | McIntyre | 192/67 R |
| 4,349,092 | 9/1982 | Geisthoff | 192/67 R |
| 4,433,767 | 2/1984 | Thor | 192/67 R |

FOREIGN PATENT DOCUMENTS

| | | | |
|---|---|---|---|
| 855807 | 11/1952 | Fed. Rep. of Germany | 192/114 R |
| 779677 | 11/1980 | U.S.S.R. | 192/67 R |

*Primary Examiner*—Rodney H. Bonck
*Attorney, Agent, or Firm*—Orrin M. Haugen; Thomas J. Nikolai; Douglas L. Tschida

[57] ABSTRACT

A coupling arrangement for drivably interconnecting the PTO shaft of a tractor with a driven shaft for an implement to be operatively towed and powered by the tractor. The implement includes an input power shaft, and the tractor portion of the apparatus includes linkage means for moving the power input shaft with respect to the PTO shaft to render the axes coincident, with means being provided to create a power transmitting coupling or connection between the PTO shaft and the power input shaft.

4 Claims, 6 Drawing Figures

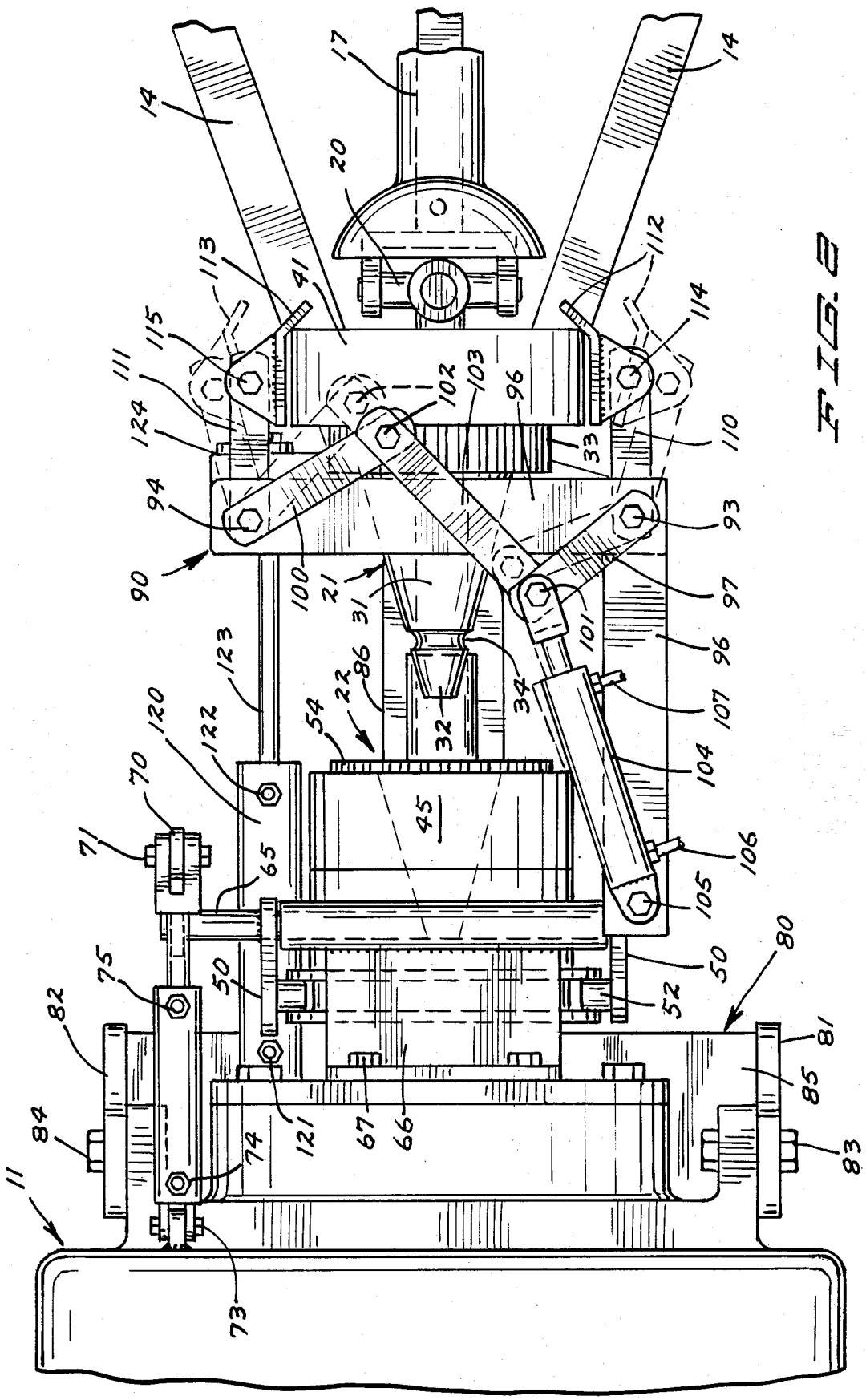

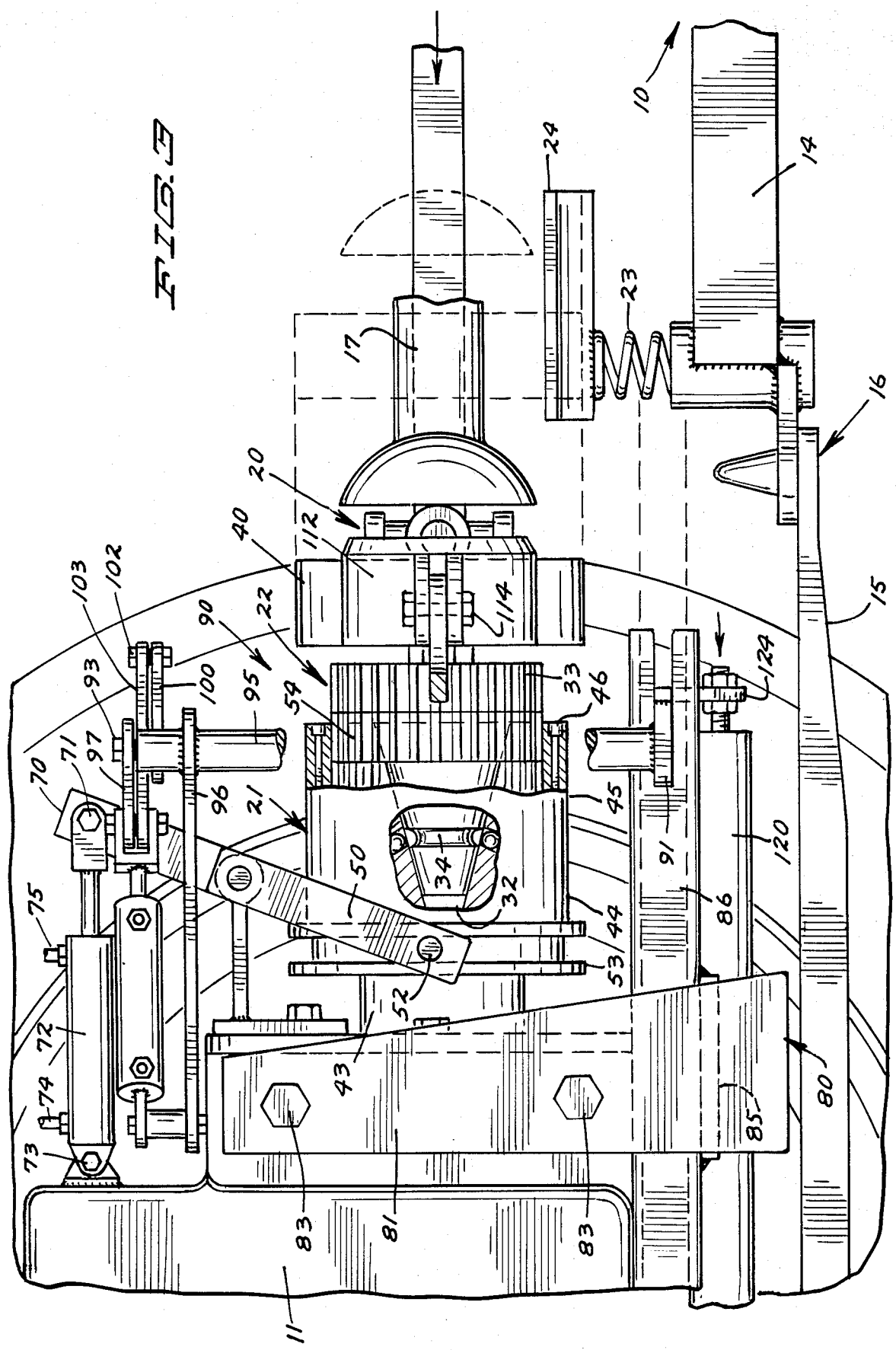

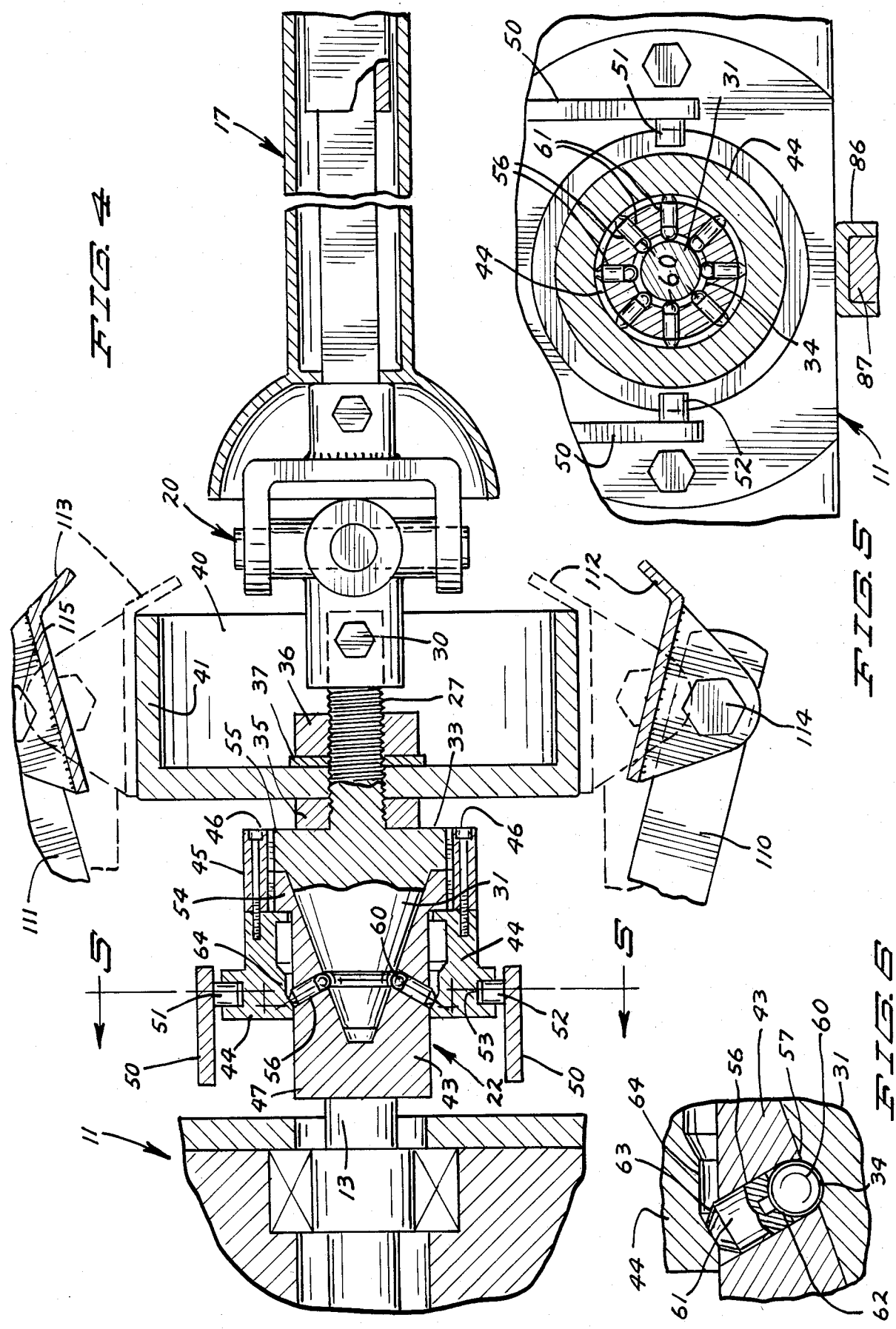

COUPLING SYSTEM FOR POWER TAKE-OFF SHAFTS

TECHNICAL FIELD

This invention relates generally to the field of agricultural engineering, particularly as that field is directed toward the design of farm implements requiring a source of rotary power during the normal use thereof, and more particularly to improved means for interconnecting a farm tractor with an implement requiring power from the power-take-off (PTO) shaft of the tractor so as to enable the operation of the implement while simultaneously transmitting power thereto.

BACKGROUND OF THE INVENTION

In the field of farming and agriculture, there are numerous implements intended to be drawn behind a tractor, while receiving power from the tractor for their operation. Such implements are extremely common and are widely employed to treat soil, to treat growing crops, and for harvesting mature crops. To this end, farm tractors are normally provided with draw bars having hitches thereon for hitching or coupling the tractor to the tongues of various implements. Farm tractors are also normally provided with PTO shafts, and the various implements are commonly provided with telescopic power input shafts such as tumbler-rods or the like for coupling the drive portion of the implement to the PTO shaft. While it is known to control the draw bar position and the power takeoff operation from the driver's position in the tractor, such control becomes considerably more difficult and complex when it is desired to simultaneously hitch the implement to the tractor while coupling or interconnecting the the power input shaft of the implement to the PTO shaft of the tractor.

BRIEF SUMMARY OF THE INVENTION

The present invention comprises an improved arrangement for hitching an implement to a tractor, while simultaneously coupling the power input shaft of the implement to the PTO shaft of the tractor with the arrangement permitting this operation to be undertaken with the operator remaining in the operator's seat. The system of the present invention permits the operator to merely back the tractor into normal operative position relative to the implement, and thereafter utilize the articulating mechanism of the device to couple the implement to the tractor and to couple the power input shaft of the implement to the tractor's PTO shaft. In undertaking this task, the first step is to generally align the members to be coupled into a substantially coaxially positions, after which the second step may be undertaken in which the members are locked into alignment and a power-transmitting connection is created between the PTO shaft and the implement power input shaft.

In most farm operations, farm tractors are employed to provide the power necessary for a wide variety of operations or tasks. Because of the seasonal nature, a single tractor is used for these various tasks. Accordingly, before any individual task may be undertaken, it is necessary to couple a specific implement to the tractor for that purpose. Initially, it is time consuming for the unskilled operator to attempt to position the tractor at a point where the hitch on the draw bar may be coupled to the mating portion of the implement tongue. In order to conserve time, operators including skilled operators, frequently attempt to guide the tractor over the last few feet of the tractor's movement while standing on the ground, and operating the clutch and other foot-operated controls by hand. Such use of a tractor is a exceedingly dangerous. Moreover, it is considerably more difficult to position a tractor relative to an implement when it is also necessary to make a connection between the PTO shaft of the tractor to a shaft powering the implement. In accordance with the present invention, however, a system has been designed which accommodates or utilizes a conventional hitch for towing the implement, together with an articulating mechanism coupled to the PTO shaft for assisting in the coupling operation between the input portion of the implement power shaft and the PTO shaft of the tractor. The entire hitching and shaft coupling operation may be undertaken by the operator without requiring that the operator leave the seat, and such coupling is achieved without difficulty, while only requiring the normal prealignment of the implement to be towed with the tractor as a precondition to the overall coupling operation.

Therefore, it is a primary object of the present invention to provide an improved arrangement for coupling a farm tractor to a powered implement, whereby the operator may complete the coupling operation without having to leave the operators seat.

It is a further object of the present invention to provide an improved arrangement for coupling a farm tractor to a towed and powered agricultural implement, with the interconnecting steps being accomplished mechanically, through the articulating mechanism and coupling arrangements of the present invention. Other and further objects of the present invention will become apparent of those skilled in the art upon the study of the following specification, appended claims, and accompanying drawings.

IN THE DRAWINGS

In the drawings, in which like reference numerals identify corresponding parts throughout the several views.

FIG. 2 is a top plan view of that portion of the structure illustrated in FIG. 1, and showing, in phantom, the movement of certain links and brackets upon actuation of the articulating mechanism;

FIG. 3 is a view similar to FIG. 1, with the power input shaft of the implement being shown coupled to the PTO shaft of the tractor, and with the articulating mechanism in its fully retracted disposition, with certain parts being shown broken away for clarity of illustration;

FIG. 4 is a fragmentary plan view, partly in section, showing a further stage in the coupling operation, and showing in phantom, the disposition of certain of the coupling elements during the coupling operation;

FIG. 5 is a fragmentary sectional view generally along the line 5—5 of FIG. 4 and illustrating details of the inter-coupling between the PTO shaft of the tractor and the power input shaft of the implement; and FIG. 6 shows a structural detail of the coupling element shown in FIG. 5, with FIG. 6 being on a slightly enlarged scale.

DESCRIPTION OF THE PREFERRED EMBODIMENT

Figure 1:
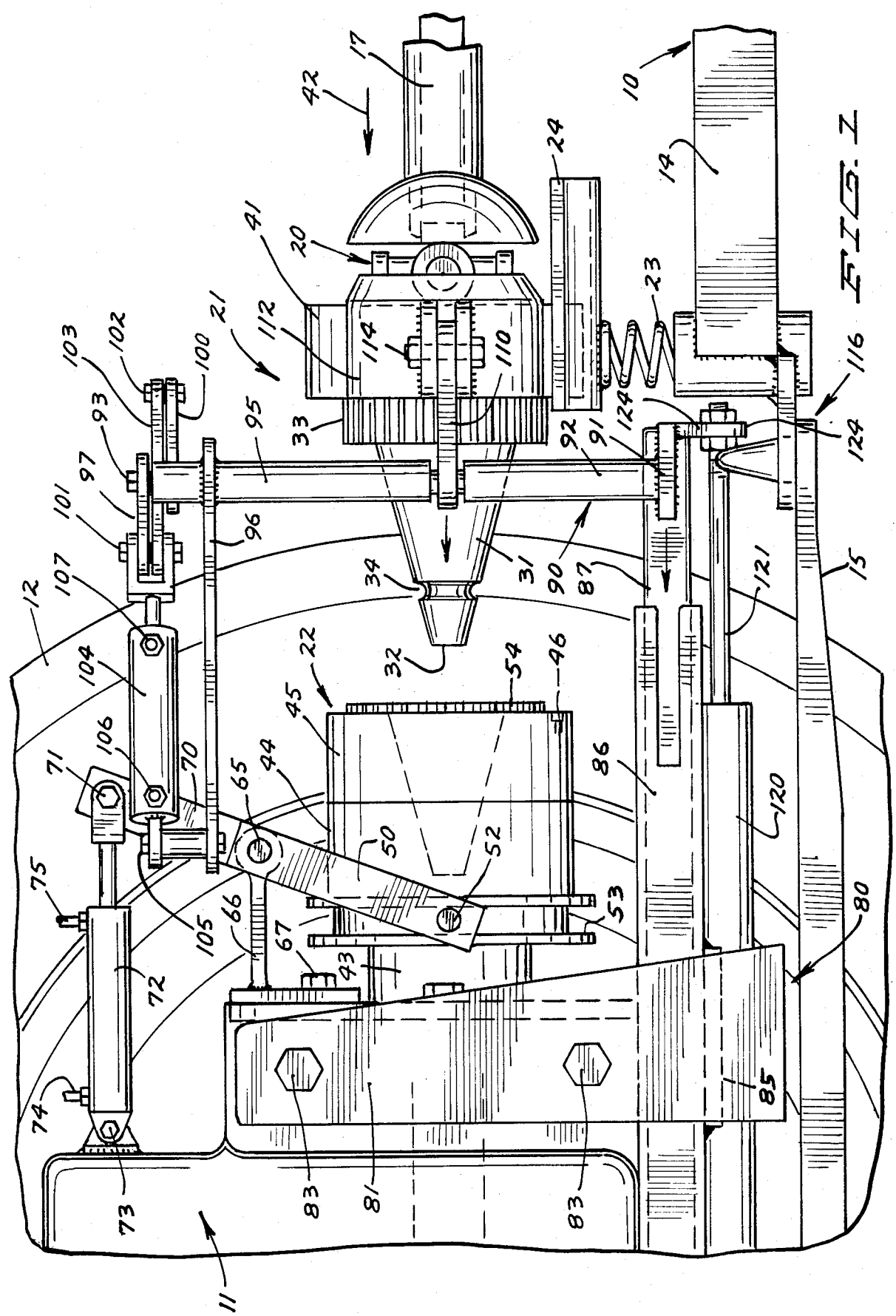
FIG. 1 is a view in elevation of a power transmission coupling fabricated in accordance with the present invention, in a first stage of use wherein the hitch on the draw bar of the tractor has been coupled to the mating hitch on the tongue of the implement, and with the PTO shaft of the tractor and the power input shaft of the implement in a nonconnected state.

Apparatus according to the invention is designed for use when the implement shown only through its tongue portion at 10 is to be towed or drawn and also powered by a tractor 11, the tractor having a plurality of wheels suggested at 12 and a PTO shaft 13 (FIG. 4). Implements of the type which would typically employ the apparatus of the present invention are numerous, and would include drills, combines, spray rigs and the like. The number and types of such implements is, of course, virtually unlimited, and with the present invention being, accordingly, designed for wide application.

Implement 10 has a tongue 14 and tractor 11 has a draw bar 15 with a conical hitch element thereon the elevation of which may be controlled to make a hitch connection 16 with the mating tongue 14. One such hitch which is adaptable for use in connection with this apparatus is disclosed in my co-pending application Ser. No. 254,750, filed Apr. 16, 1981, entitled "POWER TRANSMISSION MECHANISM", now U.S. Pat. No. 4,433,767, which is a continuation of application Ser. No. 057,601, filed July 16, 1979 and entitled "POWER TRANSMISSION MECHANISM" now abandoned, it being understood that other hitch devices may be satisfactorily utilized in connection with this system. Implement 10 also has a telescopic power input drive shaft 17 terminating at its forward end in a universal joint 20. A driven assembly 21 is operatively connected to universal joint 20, and a driving assembly 22 being connected to power take-off shaft 13.

Before the power connection between tractor and implement is completed, driven assembly 21 is supported and held on tongue 14 by a resilient bracket including a spring 23 and dished magnetic element or pad 24.

Driven assembly 21 as shown in FIG. 4, comprises a threaded stud 27 secured at one end to universal joint 20 by a fastener 30, and unitary with a male coupling member 31 having a convex conical surface which tapers outwardly from a small tip end 32 (FIG. 1) and is unitary with a first external ring gear 33. A peripheral groove 34 is formed around cone 31 at a selected axial distance from end 32, and has the cross section of a portion less than half of a circle whose center lies just outside of the surface of said conical surface and on a line normal to said surface. Secured on stud 27, as by nuts 35 and 36 and a lock washer 37, is a flanged wheel or drum 40 having a flange or rim portion 41. Assembly 21 is capable of moving axially with respect to tongue 14, in the direction of arrow 42, by reason of the telescopic action of shaft 17.

Driving assembly 22 comprises a female coupling member 43, having a concave conical surface, and secured to or unitary with PTO shaft 13, and a locking collar 44 assembled to a drive collar 45 by fasteners 46. The collar assembly is slidable axially on the outer surface 47 of member 43, by a driving fork 50 having pins 51, 52 riding in an external groove 53 in collar 44, between a first position, shown in FIGS. 1–3, and a second position, shown in FIG. 4. Member 43 is formed at its outer end with a second external gear 54 like gear 33, and drive collar 45 has an internal ring gear 55 configured to mate with gears 33 and 54, and having a face wide enough to engage both the external gears at the same time, when the assembly is in the position shown in FIG. 4: when the parts are in the position shown in FIGS. 1 and 2, or the position shown in FIGS. 3, the internal gear is axially positioned to engage only gear 54.

A plurality of bores 56 are formed in coupling member 43 and have inward lips 57 to retain a plurality of balls 60. Inserts 61 in bores 56 have inward ends 62 which engage balls 60, and outward ends 63 which extend into an internal camming groove 64 in locking collar 44. In the first position of fork 50, balls 60 and inserts 61 are free to move outward slightly in bores 56, while in the second position of fork 50 camming surface 64 acts through inserts 61 to hold ball plunges 60 at the ends of the bores, so that they project inward beyond the concave conical surface to define circular portions congruent with the circular portion defined by groove 30. The bores are directed normally to the conical surface, and are positioned axially so that when the conical surfaces are in engagement, groove 34 is in position to receive ball plunges 60, which may lock the conical surfaces against axial relative movement as long as fork 50 is in its second position.

Fork 50 is carried on a pivot 65 in a bracket 66 secured to tractor 11 by fasteners 67, and has an actuating arm 70 connected at a pivot 71 to the piston of a hydraulic motor 72 connected in turn at a pivot 73 to tractor 11, and having hydraulic connections 74 and 75.

A bracket 80 includes vertical plates 81 and 82, secured to tractor 11 by fasteners 83 and 84, and a lower cross member 85 to which there is secured a rearwardly extending hollow rectangular tube 86. A rectangular member 87 slides in tube 86, and carries a frame 90 comprising a lower plate 91 and a pair of upwardly extending tubes 92. A pair of shafts 93 and 94 have their lower ends pivoted in tubes 92, and their upper ends pivoted in tubes 95 depending from an angle plate 96. At their upper ends, shafts 93 and 94 carry actuating arms 97 and 100, interconnected at pivots 101 and 102 by a link 103, and further connected at pivot 101 to the piston of a hydraulic motor 104 connected to angle plate 96 at pivot 105, and having hydraulic connections 106 and 107.

Also connected to shafts 93 and 94, between tubes 92 and tubes 95, are a pair of arms 110 and 111. A pair of fingers 112 and 113 are connected to arms 110 and 111 by pivots 114 and 115 for engaging rim 41 of wheel 40.

A further hydraulic motor 120 is connected at one end to tractor 11. The piston 121 of this motor is connected to an arm 124 depending from plate 91. Motor 120, like motors 104 and 72, and like the tractor draw bar, is actuable from the operator's position on the tractor.

OPERATION

The operation of the invention will now be explained. It will be evident that the coupling operation including the draw bar connection and the power connection between the tractor and the implement takes place sequentially in separate stages, with the power connection being undertaken in two steps, each of which occur after the towing hitch 16 has been coupled to the implement. In the first step, the coupling members are placed or disposed in axial alignment, and thereafter the drive connection is completed in a second step.

Initially the implement is standing with wheel 40 of driven assembly 21 resting on and held by magnetic pad 24. Hydraulic motor 72 of the tractor has been operated to position fork 50 as shown in FIG. 1, hydraulic motor 104 has been operated to open arms 112 and 113, and hydraulic motor 120 has been operated to retract frame 90 toward the tractor.

The tractor operator backs his vehicle toward the implement, lowers draw bar 15, and then lifts it when the relative positions are proper, so as to make the towing connection 16 to implement tongue 14. This brings coupler members 31 and 43 into substantial horizontal and vertical alignment. The situation is then generally as shown in FIGS. 1 and 2.

To proceed with the coupling, the tractor operator energizes hydraulic motor 120 to extend frame 90 toward the implement. At the end of its travel, frame 90 is positioned so that arms 110 and 111 are adjacent to but spaced radially outwardly from drum 40. Hydraulic motor 104 is now actuated to pivot arms 110 and 111 so that fingers 112 and 113 engage wheel 40 laterally, as is also shown in FIGS. 1 and 2.

Next, hydraulic motor 120 is actuated in the opposite direction. Fingers 112 and 113 transport drum 40 from magnet 24 toward the tractor, extending telescopic shaft 17 as this occurs. Convex member 43 enters concave member 31, and universal joint 20 allows the former to become coaxial with the latter. Groove 34 becomes aligned with the position of plungers 60, and gears 33 and 54 come into face-to-face contact.

Next hydraulic motor 72 is actuated, moving fork 50 to displace the collar assembly away from the tractor. Camming groove 64 actuates inserts 61 to press plungers 60 into groove 34, thus locking member 31 axially to member 43, and internal ring gear 55, while remaining in mesh with gear 54, moves axially to engage gear 33 as well. Motor 72 remains in this position, but motor 104 must be operated in reverse to release wheel 40 from fingers 112 and 113, and motor 120 may be actuated to retract bracket 90 toward the tractor. Alignment having already been accomplished by the conical surfaces, transmission of power is now enabled by the engagement of the internal and external gears, and rotation of tractor shaft 13 may be transmitted to implement shaft 17.

From the above it will be evident that a mechanism has been provided for interconnecting the PTO shaft of a tractor with the telescopic power shaft of an implement, without any need for the operator to move from his usual operating position. The mechanism includes means for mechanically hitching the implement to the tractor, along with means for aligning the implement shaft with the tractor shaft. Also, means are provided for completing the coupling of power from the PTO shaft of the tractor to the input shaft of the implement.

Numerous characteristics and advantages of my invention have been set forth in the foregoing description, together with details of the structure and function of the invention, and the novel features thereof are pointed out in the appended claims. The disclosure, however, is illustrative only, and changes may be made in detail, especially in matters of shape, size, and arragement of parts, within the principle of the invention, to the full extent indicated by the broad general meaning of the terms in which the appended claims are expressed.

I claim:

1. A coupling mechanism comprising, in combination:
   (a) a first coupling member having a convex conical surface tapering along an axis from a smaller first end to a larger second end, said surface including a peripheral groove spaced from said ends and having the cross-section of a portion of a circle, said first coupling member further including a first external gear peripheral to said second end thereof;
   (b) a second coupling member having a concave conical surface congruent with said convex surface and tapering from a small end to a large end, said second member including a second external gear peripheral to said large end thereof, said second coupling member including latching means operable to cooperate with said peripheral groove in said first member to retain said first and second coupling members in axial relation when said first member is received in said second member with said external gears disposed in axially adjacent and coaxial relationship, one with the other;
   (c) a driving member comprising an internal gear sized to simultaneously mesh coaxially with the external gears of said first and second coupling members and thereby transmit power from said second coupling member to said first coupling member, the width of said internal gear face being substantially the same as the sum of the widths of the gear faces of the external gears of said first and second coupling members;
   (d) means actuable to move said first coupling member axially into a position in which the concave and convex surfaces of said first and second coupling members are in engagement;
   (e) and means actuable to move said driving member axially so as to selectively engage either one or both of said external gears.

2. A coupling mechanism according to claim 7 in which said latching means comprises:
   (a) a plurality of balls spaced about the axis of said concave surface and a plurality of inserts movable into engagement with said balls to displace said balls into said groove in said convex conical surface;
   (b) and in which the latching means is rotatable with said second coupling member and includes a camming surface for causing inward radial movement of said inserts and means for causing axial movement of said camming surface.

3. A coupling mechanism according to claim 1 in which:
   (a) the center of the peripheral groove portions formed in said first and second coupling members when said members are moved into engagement collectively define a circle, the center of which lies generally outside each of said conical surfaces, so that each of said peripheral groove portions is less than a semicircle, and also lies on a line substantially tangent to said conical surface; and
   (b) said latching means includes a plurality of balls; and
   (c) means operable to move said balls to provide inwardly beyond said concave conical surface to an extent in which they define portions of circles congruent with the cross-section of said groove, the directions of movement of said balls being normal to said conical surfaces.

4. A coupling mechanism according to claim 1 in which said second coupling member comprises:
   (a) latching means operable, when said first and second coupling members are in engagement, to cooperate with said peripheral groove in said first member to retain said members in said predetermined axial relationship; and
   (b) means for operating said latching means.

* * * * *

UNITED STATES PATENT AND TRADEMARK OFFICE
CERTIFICATE OF CORRECTION

PATENT NO. : 4,492,292
DATED : January 8, 1985
INVENTOR(S) : Charles C. Thor

It is certified that error appears in the above-identified patent and that said Letters Patent are hereby corrected as shown below:

Column 6, Line 32, "7" should read -- 1 --.

Column 6, Line 56, "provide" should read -- protrude --.

Signed and Sealed this

Second Day of July 1985

[SEAL]

Attest:

DONALD J. QUIGG

Attesting Officer

Acting Commissioner of Patents and Trademarks